(12) United States Patent
Alam

(10) Patent No.: US 7,159,025 B2
(45) Date of Patent: Jan. 2, 2007

(54) SYSTEM FOR SELECTIVELY CACHING CONTENT DATA IN A SERVER BASED ON GATHERED INFORMATION AND TYPE OF MEMORY IN THE SERVER

(75) Inventor: Bilal Alam, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 10/378,522

(22) Filed: Mar. 3, 2003

(65) Prior Publication Data

US 2003/0182390 A1    Sep. 25, 2003

Related U.S. Application Data

(60) Provisional application No. 60/366,797, filed on Mar. 22, 2002.

(51) Int. Cl.
*G06F 15/173* (2006.01)

(52) U.S. Cl. .................................... 709/225; 709/224

(58) Field of Classification Search ................ 709/217, 709/218, 219, 225, 226, 216, 224; 348/114; 725/92; 711/133; 705/50
See application file for complete search history.

(56) References Cited

U.S. PATENT DOCUMENTS

| | | | |
|---|---|---|---|
| 5,146,593 A | 9/1992 | Brandle et al. | |
| 5,155,837 A | 10/1992 | Liu et al. | |
| 5,706,507 A | 1/1998 | Schloss | |
| 5,715,386 A | 2/1998 | Fulton, III et al. | |
| 5,918,226 A | 6/1999 | Tarumi et al. | |
| 6,098,064 A | 8/2000 | Pirolli et al. | |
| 6,188,698 B1 | 2/2001 | Galand et al. | |
| 6,219,760 B1 | 4/2001 | McMinn | |
| 6,223,202 B1 | 4/2001 | Bayeh | |
| 6,463,465 B1 | 10/2002 | Nieuwejaar | |
| 6,542,920 B1 | 4/2003 | Belkin et al. | |
| 6,574,712 B1 | 6/2003 | Kahle et al. | |
| 6,594,784 B1 | 7/2003 | Harper et al. | |
| 6,622,168 B1 | 9/2003 | Datta | |
| 6,629,266 B1 | 9/2003 | Harper et al. | |
| 6,732,138 B1 | 5/2004 | Browning et al. | |
| 6,810,495 B1 | 10/2004 | Castelli et al. | |
| 6,820,215 B1 | 11/2004 | Harper et al. | |
| 6,978,398 B1 | 12/2005 | Harper et al. | |
| 2002/0047899 A1* | 4/2002 | Son et al. ................. | 348/114 |
| 2002/0062372 A1* | 5/2002 | Hong et al. ............... | 709/225 |
| 2002/0069420 A1* | 6/2002 | Russell et al. ............ | 725/92 |
| 2002/0078174 A1* | 6/2002 | Sim et al. ................. | 709/219 |
| 2002/0087612 A1 | 7/2002 | Harper et al. | |
| 2002/0087797 A1* | 7/2002 | Adrangi ................... | 711/133 |

(Continued)

OTHER PUBLICATIONS

Li et al., "An Approach for Estimation of Software Aging in a Web Server", 2002, 10 pages, IEEE.

(Continued)

*Primary Examiner*—Le Hien Luu
(74) *Attorney, Agent, or Firm*—Lee & Hayes, PLLC

(57) ABSTRACT

Methods and apparatuses are provided for use in servers or other like devices that output content data based on requests. Activity and/or other like information, e.g., in the form of Metadata, is gathered/maintained for each handled request and used to determine if the corresponding content data should be cached in memory to speed up subsequent similar requests for the content data, or conversely removed from the memory cache. The activity and/or other like information can be considered in light of one or more activity or other useful parameters that define the operation of the resulting content data cache(s).

27 Claims, 2 Drawing Sheets

U.S. PATENT DOCUMENTS

| | | |
|---|---|---|
| 2002/0120710 A1* | 8/2002 | Chintalapati et al. ........ 709/216 |
| 2002/0129123 A1 | 9/2002 | Johnson et al. |
| 2002/0147966 A1 | 10/2002 | Frazier |
| 2002/0152328 A1 | 10/2002 | Kagan et al. |
| 2002/0161908 A1 | 10/2002 | Benitez et al. |
| 2003/0061378 A1 | 3/2003 | Mazzitelli |
| 2003/0079154 A1 | 4/2003 | Park et al. |
| 2003/0135464 A1* | 7/2003 | Mourad et al. ................ 705/50 |

OTHER PUBLICATIONS

Mercer et al., "Processor Capacity Reserves: An Abstraction for Managing Processor Usage", Workstation Operating Systems, 1993. Proceedings. Fourth Wordshop on, Oct. 14-15, 1993, pp. 129-134.

Zhou et al., "Processor Pool-Based Scheduling for Large-Scale NUMA Multiprocessors", Joint International Conference on Measurement and Modeling of Computer Systems, pp. 133-142, Year of Publication: 1991.

* cited by examiner

SYSTEM FOR SELECTIVELY CACHING CONTENT DATA IN A SERVER BASED ON GATHERED INFORMATION AND TYPE OF MEMORY IN THE SERVER

RELATED PATENT APPLICATIONS

This U.S. patent application claims the benefit of priority from, and hereby incorporates by reference the entire disclosure of, co-pending U.S. Provisional Application for Letters Patent Ser. No. 60/366,797, filed Mar. 22, 2002, and titled "Activity Period of Optimization".

TECHNICAL FIELD

The present invention relates generally to computers and like devices, and more particularly to methods, apparatuses and systems for selectively caching content data within at least one server or other like device that is configured to provide the cached content data to at least one client or other like device.

BACKGROUND

The popularity of the Internet, and in particular, the portion of the Internet known as the World Wide Web, continues to grow. The World Wide Web is basically a collection of computers that are operatively linked together through a plurality of communication networks. Typically, users access the World Wide Web through a personal computer or like device, which is connected to the Internet via a modem of some type. For example, many users of the World Wide Web connect to the Internet using a dial-up telephone networked modem configured to establish data communications through an Internet Services Provider (ISP). Other users connect to the Internet with a faster modem, e.g., a cable modem, digital subscriber line (DSL) modem, etc.

Regardless of how a user ultimately connects to the Internet/World Wide Web, once connected, the user typically accesses information available therein by using a web browser or like application. A web browser is configured to access web pages that are provided through the Internet by other computers. For example, one or more web server computers may be connected to the Internet and configured with one or more web sites or other supporting web applications. A web site typically has one or more static web pages and/or is capable of supplying one or more dynamically generated web pages that the user may selectively download, view and possibly interact with.

To identify a particular web site/page, the user will typically select a hyper-link to the desired web site/page or may choose to manually enter a unique name for the web site/page. The most common name used for identifying a web site/page is known as the uniform resource locator (URL). By entering a URL, the user will be connected to an appropriate web server which hosts the applicable web application(s), and the requested web page will be downloaded, in this case using a hypertext transfer protocol (HTTP), to the web browser. Within the Internet itself, the selected URL is associated with a specific Internet Protocol (IP) address. This IP address takes the form of a unique numerical identifier, which has been assigned to the targeted web server. Thus, a user may also directly enter an IP address in the web browser. However, the majority of users tend to favor the use of the more easily remembered and entered URL.

When a typical web server receives a request, e.g., an HTTP request, from a web browser, it needs to handle the request. Hence, a web server process may be configured to handle the request itself, or may need to pass the request on to another process, e.g., a worker process, that is configured to handle the request.

Regardless as to how the request is handled, the result is that a response is generated. The response includes some type of content data and is provided to the requesting client program/device. One example of content data is a web page that is then processed and typically displayed by a browser. It takes time and computational resources for the web server to handle the request, and to generate or otherwise output the appropriate content data. Typically, a web server handles a plurality of web pages associated with one or more web sites.

One common practice is to buffer content data in memory after it has been generated. Consequently, when a subsequent request for the buffered content data is received the content data need not be generated again but rather served directly from memory to the client program/device. This usually reduces the response time and/or the processing load. In certain conventional web servers, the buffering techniques include buffering newly generated content data. Since there is only a finite amount of memory available for buffering content data, there is usually not enough memory to hold all of the content data that a web site and/or web server may need to output. As such, eventually some web content will need to be generated fresh/again.

It would be beneficial to have improved techniques for managing the buffered content data such that the web server's performance is further improved.

SUMMARY

Methods and apparatuses are provided for use in servers or other like devices that output content data based on requests. Activity and/or other like information is gathered/maintained for each handled request and used to determine if the corresponding content data should be cached in memory to speed up subsequent similar requests for the content data, or conversely not cached in memory. The activity and/or other like information can be considered in light of one or more activity parameters or other useful parameters that essentially define the operation of the resulting content data cache(s).

By way of example, the above stated needs and others are met by an apparatus for use in a server device. Here, the apparatus includes logic that is operatively coupled to memory and configured to gather information about at least one request for content data, and selectively store the content data in at least one content data cache in the memory based on the gathered information.

The gathered information may include activity information associated with a defined period of time. The gathered information may include content data type information and/or content data size information.

The logic may be configured to selectively store the content data in the least one content data cache based on at least one parameter. Here, for example, the parameter may define a period of time associated with the gathered information, define at least one activity level threshold value, define a content data type, and/or define at least one content data size threshold value.

In certain implementations, the logic can be configured to selectively modify at least one parameter. The logic may even dynamically modify at least one parameter.

In other implementations, the logic can be configured to selectively store the content data in the at least one content data cache based on a type of the memory being used or available.

The logic can be configured to output the content data stored in at least one content data cache.

BRIEF DESCRIPTION OF THE DRAWINGS

A more complete understanding of the various methods, apparatuses and systems of the present invention may be had by reference to the following detailed description when taken in conjunction with the accompanying drawings wherein.

DESCRIPTION

Figure 1:
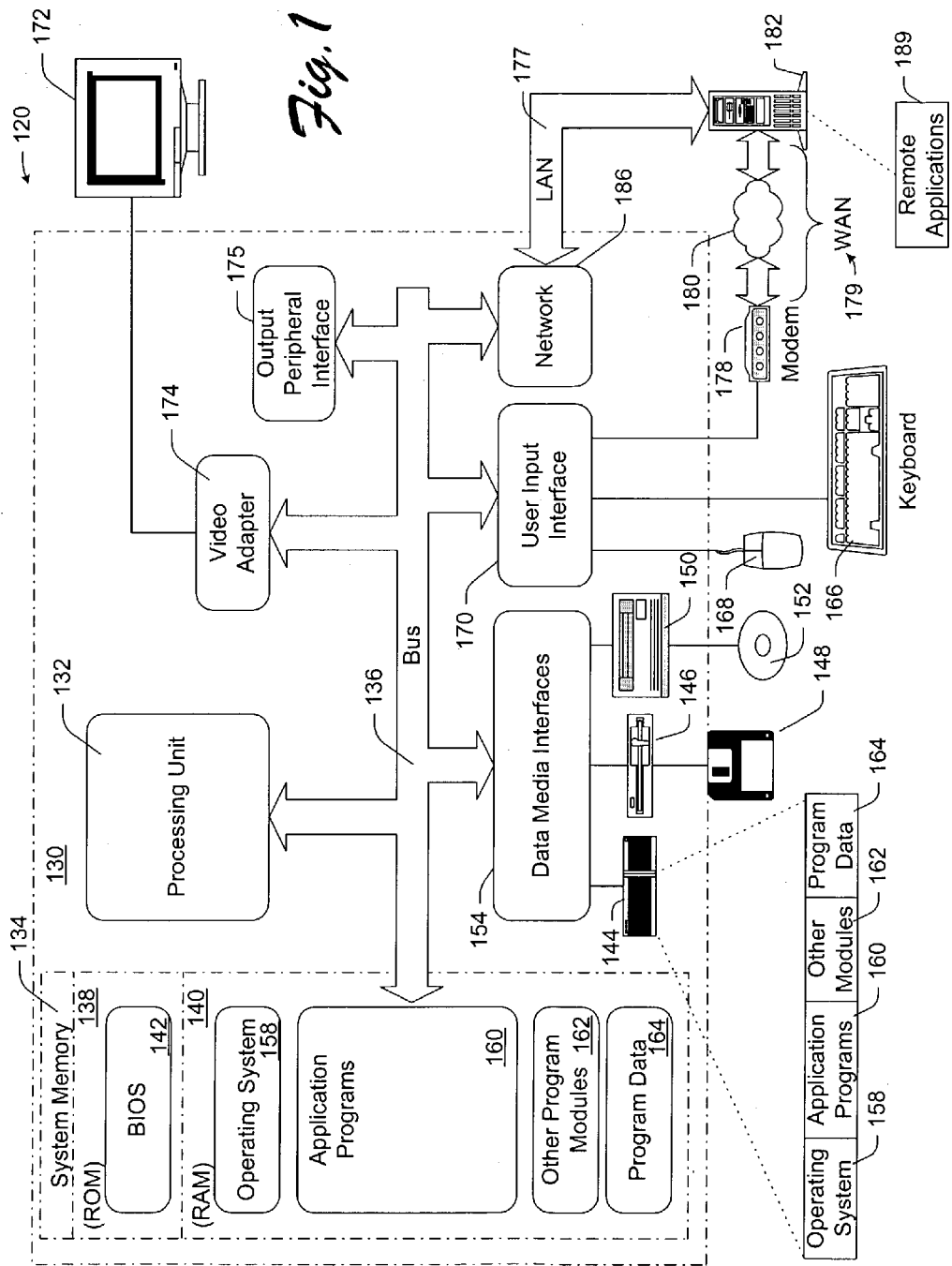
FIG. 1 is a block diagram that depicts an exemplary device, in the form of a computer, which is suitable for use with certain implementations of the present invention.

FIG. 1 depicts a computing environment 120 that includes a general-purpose is computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
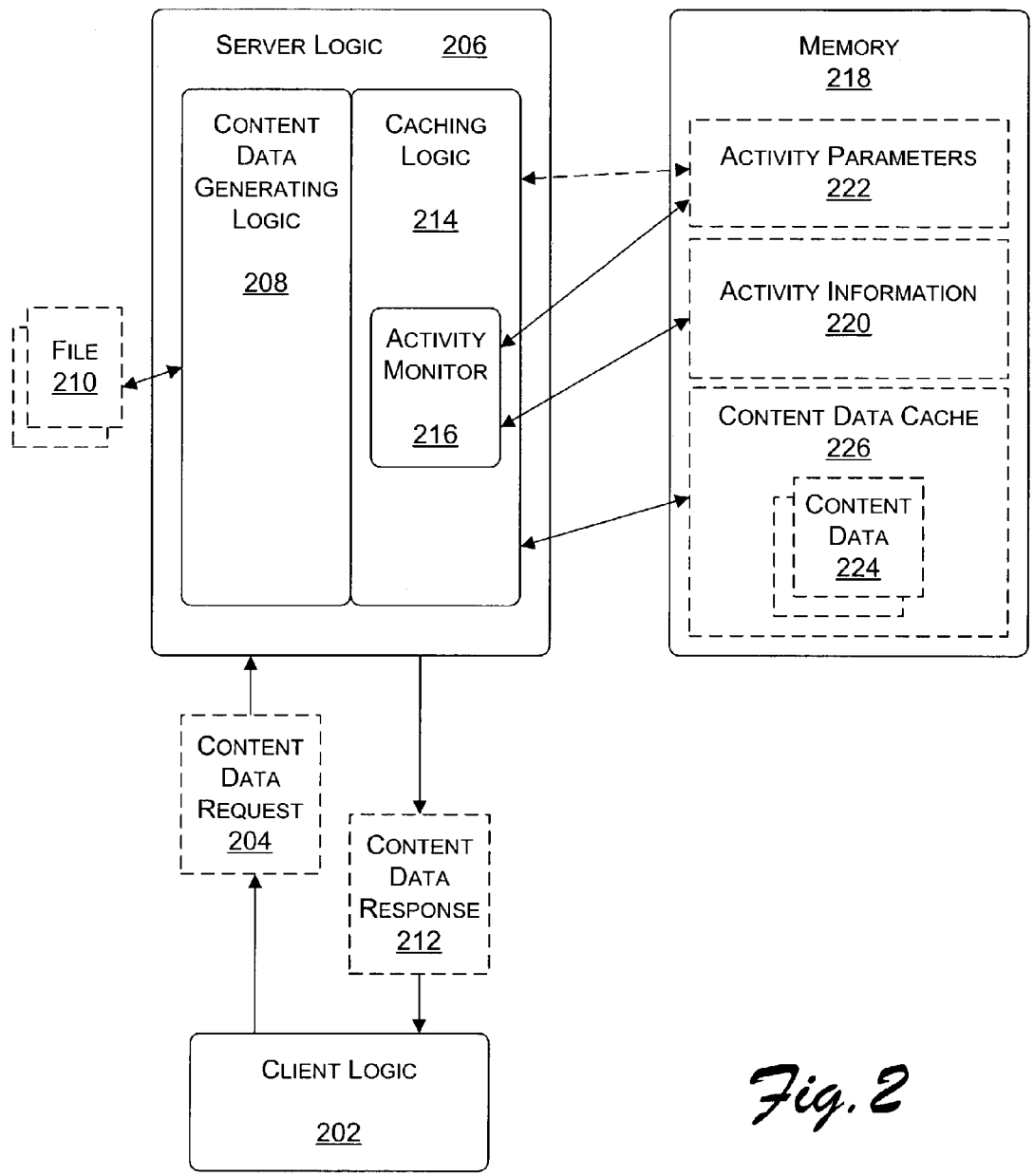
FIG. 2 is a block diagram depicting a selective content data caching arrangement, in accordance with certain exemplary implementations of the present invention.

Attention is now drawn to FIG. 2, which is a block diagram illustrating an exemplary client-server arrangement 200 that includes a selective content caching capability in accordance with certain implementations of the present invention. While the following description includes an exemplary web server such as might be found on the Internet, an intranet, etc., it should be understood that other non-web based client-server arrangements and other like configurations can also benefit from the improved methods and apparatuses provided herein.

With this in mind, client server arrangement 200 includes client logic 202 which is configured to provide a content data request 204 to server logic 206. Here, for example, content data request 204 may include a web page request that is sent over a network from a client computer to one or more server devices.

Let this be the first time that content data request 204 has been received by server logic 206. This means that the requested content data is not readily available in a content data cache, at least not yet. As such, server logic 206 needs to generate a corresponding content data response. To accomplish this task, sever logic 206 includes content data generating logic 208 which is configured to generate content data response 212, which is provided by server logic 206 to client logic 202.

Content data generating logic 208, in this example, accesses one or more files 210. Here, file 210 may be stored on a hard drive or other like storage mechanism(s). File 210 may include static data, script data, dynamic data, etc. Content data generating logic 208 processes this data, as/if needed, to produce content data that is included in content data response 212.

Server logic 206 also includes caching logic 214. Within caching logic 214 there is an activity monitor 216. As illustrated by the solid-lined arrows, server logic 206 is configured to access memory 218. For example, activity monitor 216 is configured to access activity information 220 and at least one activity parameter 222 stored within memory 218, and caching logic 214 is configured to access content data 224 within at least one content data cache 226 in memory 218.

Returning to the exemplary request handing process started earlier, once content data generating logic 208 has generated content data for content data response 212, activity monitor 216 modifies activity information 220 to record that the particular content data was requested. In this manner, activity information 220 begins to collect information regarding the demand for the particular content data that was requested.

In accordance with certain implementations, for example, caching logic 214 can be configured to determine whether a particular content data 224 is to be stored in content data cache 226 based on one or more activity parameters 222 including the level of continuing and/or sustained demand for the content data over a period of time.

At this point in this exemplary request handing process, it is assumed that the content data generated for this initial request does not qualify for storage in content data cache 226.

Assume now that a subsequent content data request 204 is received by server logic 206. Server logic 206, using caching logic 214, determines if the content data for this subsequent request is available within content data cache 226. Here, the requested content data is not yet in content data cache 226. As such, server logic 206 needs to generate the content data once again and server logic 206 needs to output content data response 212 as it did before. Activity monitor 216 will once again modify activity information 220 to record this subsequent request for the same content data.

Caching logic 214 along with activity monitor 216 will determine, based on one or more activity parameters 222 and activity information 220, if the content data generated for the subsequent request should be stored in content data cache 226. There are a variety of decisional techniques that may be employed to determine when to add (or remove) content data 224 to (from) content data cache 226. Several decisional techniques are described in greater detail below. For now, in this example, assume that caching logic 214 and activity monitor 216 are configured to store the content data 224 in content data cache 226 because activity information 220 shows that there have been enough requests for this particular content data within a specified period of time. Here, for example, activity parameters 222 may include a threshold demand storage value and/or a threshold demand removal value that is used to determine is content data 224 is stored or removed, respectively, from content data cache 226. Activity parameters 222 may include information establishing the period of time over which demand is measured. These and other activity parameters may be programmably set and in certain implementations dynamically adjusted to further optimize or otherwise change the operation of server logic 206 and/or memory 218.

In the above exemplary process, assume that receiving two requests within a period of ten seconds qualifies content data 224 to be stored in content data cache 226. Then assume that a third content data request 204 is received. Now caching logic 214 will be able to quickly access content data 224 from content data cache 226 and therefore server logic 206 can output a corresponding content data response 212 without requiring content data generating logic 208 to again generate such content data.

Thus, as described above, activity monitor 216 and caching logic 214 can be configured to store content data 224 having "high enough" demand in content data cache 226, and also to remove/erase content data 224 from content data cache 226 when demand is not high enough.

In this example, activity information 220 is modified for each request that is handled regardless as to whether the content data was generated or read from content data cache 226. In the exemplary demand level decision process described above, activity information for any given request for content data need only be stored in activity information 220 for the defined period of time. Thus, for example, in certain implementations, a unique identifier and timestamp can be recorded in activity information 220 for a given request for content data. After the defined period of time has passed within enough subsequent similar requests, then the unique identifier and associated timestamp become stale and can be removed/erased from activity information. What this illustrates is that with the proper settings of activity parameters 222, the amount of memory required for activity information 220 can be significantly controlled and also only a small amount of information need be recorded in activity information 220.

One of the benefits to this arrangement is that content data cache 226 may be configured to only include content data 224 that is in high enough demand. This tends to make the server run more efficiently as it is not buffering content data that is seldom requested.

As mentioned, caching logic 214 in certain implementations is configured to dynamically change one or more activity parameters 222 that are used to determine what content data is added to, or removed from, content data cache 226 and when. This dynamic relationship is illustrated in FIG. 2 by the dashed-line arrow between caching logic 214 and activity parameters 222. Thus, for example, caching logic 214 may increase the demand measuring period at times when fewer requests are being received, and/or decrease the demand measuring period at times when more requests are being received to optimize use of the processing and/or memory resources in the server. Similarly, the threshold demand levels can be dynamically adjusted to promote certain efficiencies.

The above examples are directed towards demand-based caching decisions. Arrangement 200, may also take into account still other decisional information. Thus, for example, in certain implementations caching logic 214 and/or activity monitor 216 can be configured to base caching decisions on other activity parameters 222 such as the type of content data. Here, some types of content data may be considered better caching candidates than other types of content data. For example, content data that requires additional processing time may be a better caching candidate than content data that is easier to generate. In another example, the size of the content data can be considered. Thus, for example, in certain implementations it may prove beneficial to cache larger sized content data, while in other implementations smaller sized content data may be better caching candidates.

In still other implementations, caching logic 214 and/or activity monitor 216 also consider the type(s) of memory 218 that content data cache 226 is stored in. Thus, for example, content data cache 226 may extend across different memory structures and certain content data 224 may be better off if stored in particular memory locations.

In one example, content data cache(s) may include both user-mode and kernel-mode memory, and content data 224 that is in very high demand may be stored in kernel-mode memory for even quicker handling. Similarly, certain types or sizes of content data may be better stored in either kernel-mode or user-mode memory.

In other implementations, the memory includes different levels (e.g., L1, L2, etc,) memory based on the hardware structure of the server device. Here, again, certain high-demand, low-demand, types, and/or sizes of content data may be better stored in content data cache within certain memory levels.

Although some preferred implementations of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention.

What is claimed is:

1. An apparatus for use in a server device having memory, the apparatus comprising:
   logic operatively coupled to said memory and configured to gather information about at least one request for content data, and selectively store said content data in at least one content data cache in said memory based on said gathered information;
   wherein said gathered information comprises content data type, content data size, and activity information that is associated with a defined time period; and
   wherein said logic is configured to selectively store said content data by:
      comparing said gathered information with corresponding predefined threshold values, the predefined threshold values being dynamically-adjustable by the server device, and
      determining the type of memory in the server device.

2. The apparatus as recited in claim 1, wherein said logic is further configured to selectively store said content data in said at least one content data cache based on at least one parameter.

3. The apparatus as recited in claim 2, wherein said at least one parameter defines a period of time associated with said gathered information.

4. The apparatus as recited in claim 2, wherein said at least one parameter defines an activity level threshold value.

5. The apparatus as recited in claim 2, wherein said at least one parameter defines a content data type.

6. The apparatus as recited in claim 2, wherein said at least one parameter defines a content data size threshold value.

7. The apparatus as recited in claim 2, wherein said logic is further configured to selectively modify said at least one parameter.

8. The apparatus as recited in claim 2, wherein said logic is further configured to dynamically modify said at least one parameter.

9. The apparatus as recited in claim 1, wherein said logic is further configured to output said content data stored in said at least one content data cache.

10. A method for use in a server device, the method comprising:
    determining content data;
    gathering information about at least one request for said content data; and
    selectively storing said content data in at least one content data cache in memory based on said gathered information;
    wherein said gathered information comprises content data type, content data size, and activity information that is associated with a defined time period; and
    wherein selectively storing said content data comprises:
       comparing said gathered information with corresponding predefined threshold values, the predefined threshold values being dynamically-adjustable by the server device, and
       determining the type of memory in the server device.

11. The method as recited in claim 10, further comprising: selectively storing said content data in said at least one content data cache based on at least one parameter.

12. The method as recited in claim 11, wherein said at least one parameter defines a period of time associated with said gathered information.

13. The method as recited in claim 11, wherein said at least one parameter defines an activity level threshold value.

14. The method as recited in claim 11, wherein said at least one parameter defines a content data type.

15. The method as recited in claim 11, wherein said at least one parameter defines a content data size threshold value.

16. The method as recited in claim 11, further comprising: selectively modifying said at least one parameter.

17. The method as recited in claim 11, further comprising: dynamically modifying said at least one parameter.

18. The method as recited in claim 10, further comprising: outputting said content data stored in said at least one content data cache.

19. A computer-readable medium having computer implementable instructions for configuring at least one processing unit in a server device, to perform acts comprising:

determining content data;

gathering information about at least one request for said content data; and selectively storing said content data in at least one content data cache in memory based on said gathered information;

wherein said gathered information comprises content data type, content data size, and activity information that is associated with a defined time period; and wherein selectively storing said content data comprises:
  comparing said gathered information with corresponding predefined threshold values, the predefined threshold values being dynamically-adjustable by the server device, and
  determining the type of memory in the server device.

20. The computer-readable medium as recited in claim 19, further comprising:

selectively storing said content data in said at least one content data cache based on at least one parameter.

21. The computer-readable medium as recited in claim 20, wherein said at least one parameter defines a period of time associated with said gathered information.

22. The computer-readable medium as recited in claim 20, wherein said at least one parameter defines an activity level threshold value.

23. The computer-readable medium as recited in claim 20, wherein said at least one parameter defines a content data type.

24. The computer-readable medium as recited in claim 20, wherein said at least one parameter defines a content data size threshold value.

25. The computer-readable medium as recited in claim 20, further comprising:

selectively modifying said at least one parameter.

26. The computer-readable medium as recited in claim 20, further comprising:

dynamically modifying said at least one parameter.

27. The computer-readable medium as recited in claim 19, further comprising:

outputting said content data stored in said at least one content data cache.

* * * * *